(12) United States Patent
Shyam et al.

(10) Patent No.: US 8,577,855 B2
(45) Date of Patent: Nov. 5, 2013

(54) ONLINE FILE SYSTEM CONSISTENCY CHECK

(75) Inventors: Nagaraj Shyam, Cupertino, CA (US); Craig Keatley Harmer, San Francisco, CA (US); George Mathew, Belmont, CA (US)

(73) Assignee: Symantec Corporation, Mountain View, CA (US)

( * ) Notice: Subject to any disclaimer, the term of this patent is extended or adjusted under 35 U.S.C. 154(b) by 221 days.

(21) Appl. No.: 12/907,821

(22) Filed: Oct. 19, 2010

(65) Prior Publication Data

US 2012/0095971 A1  Apr. 19, 2012

(51) Int. Cl.
*G06F 17/30* (2006.01)

(52) U.S. Cl.
USPC .......................................................... 707/704

(58) Field of Classification Search
USPC ........................... 707/2, 704; 714/48; 712/214
See application file for complete search history.

(56) References Cited

U.S. PATENT DOCUMENTS

| | | | |
|---|---|---|---|
| 5,909,540 A * | 6/1999 | Carter et al. .................. 714/4.4 |
| 6,763,455 B2 | 7/2004 | Hall | |
| 7,028,158 B1 | 4/2006 | Beatty et al. | |
| 7,546,319 B1 | 6/2009 | Srinivasan et al. | |
| 7,694,191 B1 * | 4/2010 | Bono et al. ....................... 714/48 |
| 2005/0149697 A1 * | 7/2005 | Enright et al. ................ 712/214 |
| 2007/0055702 A1 * | 3/2007 | Fridella et al. ................ 707/200 |
| 2008/0189343 A1 | 8/2008 | Hyer et al. | |
| 2009/0006494 A1 | 1/2009 | Hong et al. | |

OTHER PUBLICATIONS

Val Henson; et al., CHUNKFS: Using divide-and-conquer to improve file system reliability and repair; 6 pages, 2006.
Amit Gud, CHUNKFS: A Recovery-Driven File System Design Approach, A thesis, submitted in partial fulfillment of the requirements for the degree, Department of Computing and Information Sciences College of Engineering, Kansas State University, Manhattan, Kansas 2007, 68 pages.

* cited by examiner

*Primary Examiner* — Etienne Leroux
(74) *Attorney, Agent, or Firm* — Wilmer Cutler Pickering Hale and Dorr LLP

(57) ABSTRACT

A lock is acquired on a data structure. Content in the data structure is read and verified while the lock is held. The lock is then released, and then the file system components that are referred to by the data structure are verified. In essence, a file system consistency check of the file system components is performed offline in the background while the data structure remains accessible.

20 Claims, 8 Drawing Sheets

ONLINE FILE SYSTEM CONSISTENCY CHECK

BACKGROUND

Databases are susceptible to corruption/inconsistencies while they are in use. Inconsistencies can be introduced by operator error, hardware failure, a problem with controller firmware, etc.

A database may include file system metadata, which essentially consists of a hierarchical arrangement of directories and files. When corruption occurs or is suspected, an error checking and correction process can be run to check the validity of entries in the database and find any errors. One such process is commonly known and referred to as "FSCK" (file system consistency check). A tool commonly used to identify and fix corruptions of NTFS (New Technology File Systems) is referred to as "chkdsk."

A problem with processes such as FSCK is that they can take a relatively long time to run. For example, FSCK can take several tens of hours to run, depending on the size of the database. While FSCK is run, the database may be taken offline, which makes it inaccessible to other system components and processes that rely on it.

If FSCK is run while the database is online, then an exclusive (write) lock on the database is acquired in order to prevent the database from being changed while the check is being performed. For a database such as a directory inode, which may have many thousands if not millions of entries, the exclusive lock prevents other processes from performing even read operations on the directory for several minutes. While this may seem like a relatively short amount of time, it is not in practice as several minutes of delay can inconvenience large numbers of users, especially in global file systems such as storage area networks (SANs) and cluster file systems.

SUMMARY

To reduce the amount of time a data structure such as a database is inaccessible, a lock is acquired on the data structure. Content in the data structure is read and checked while the lock is held. The lock is released, and the file system components that are referred to by the data structure are then checked. Thus, the file system components can be checked while the data structure is accessible to other processes without a need to exclusively lock out the other processes to prevent them from viewing or modifying the content in the data structure.

In one embodiment, the data structure constitutes a directory inode, the content includes file names and inode numbers, and the file system components include inodes.

In one embodiment, the lock is reacquired after the initial lock is released and after the file system components referred to by the data structure are checked. A version number associated with the data structure can then be checked to see if the version number changed. If the version number changed, then the content in the data structure is again read and validated. In one embodiment, if the version number changed, then only content in the data structure that has changed since the initial lock was acquired is identified and verified. After the data structure is read and validated, the lock is released and the file system components referred to by the data structure can again be checked. Only those components associated with the changed data structure content may be checked.

In another embodiment, before the initial lock is released, a version number associated with the data structure is checked to see if the version number changed. If the version number changed, then the content in the data structure is again read and validated. In one embodiment, if the version number changed, then only content in the data structure that has changed since the initial lock was acquired is identified and verified. If the version number did not change, then the lock is released and the file system components referred to by the data structure can be checked.

In one embodiment, the number of attempts to read and verify the content in the data structure is counted. If the number of attempts reaches a threshold, then the lock is held while the content in the data structure and the file system components referred to by the data structure are read and verified.

In essence, according to embodiments of the present disclosure, a file system consistency check of a data structure is performed with a lock on the data structure in place. The lock is then removed, and then the remainder of the file system consistency check (of the file system components referred to by the data structure) is performed while the data structure remains accessible, concurrently with accesses to the data structure. In general, an online full file system consistency check can be performed on a large data structure and numerous file system components with a reduced number of lock acquisitions, in turn reducing the amount of time that the data structure is unavailable to other processes and components. A lock may be used for only a relatively brief amount of time at the beginning and at the end of the process for validating a data structure such as a directory inode.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
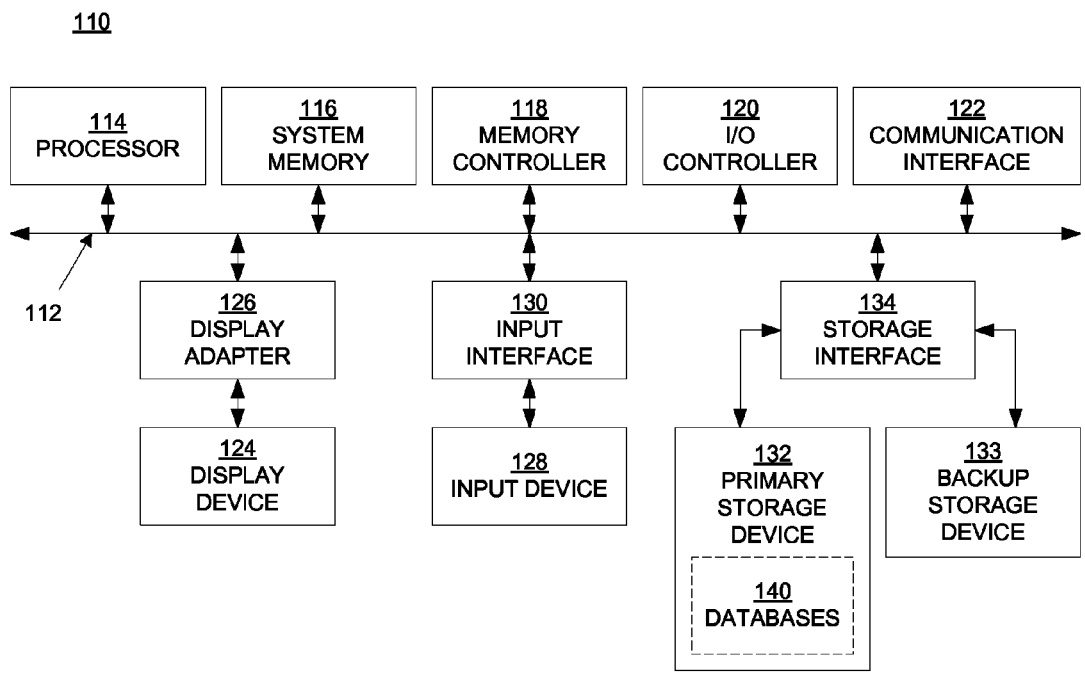
FIG. 1 is a block diagram of an example of a computer system upon which embodiments of the present disclosure can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "acquiring," "verifying," "releasing," "performing," "checking," "reading," "counting," "implementing," "obtaining," "subjecting," "validating," "determining," "protecting," or the like, refer to actions and processes (e.g., flowcharts 700, 800, and 900 of FIGS. 7, 8, and 9, respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

Figure 2:
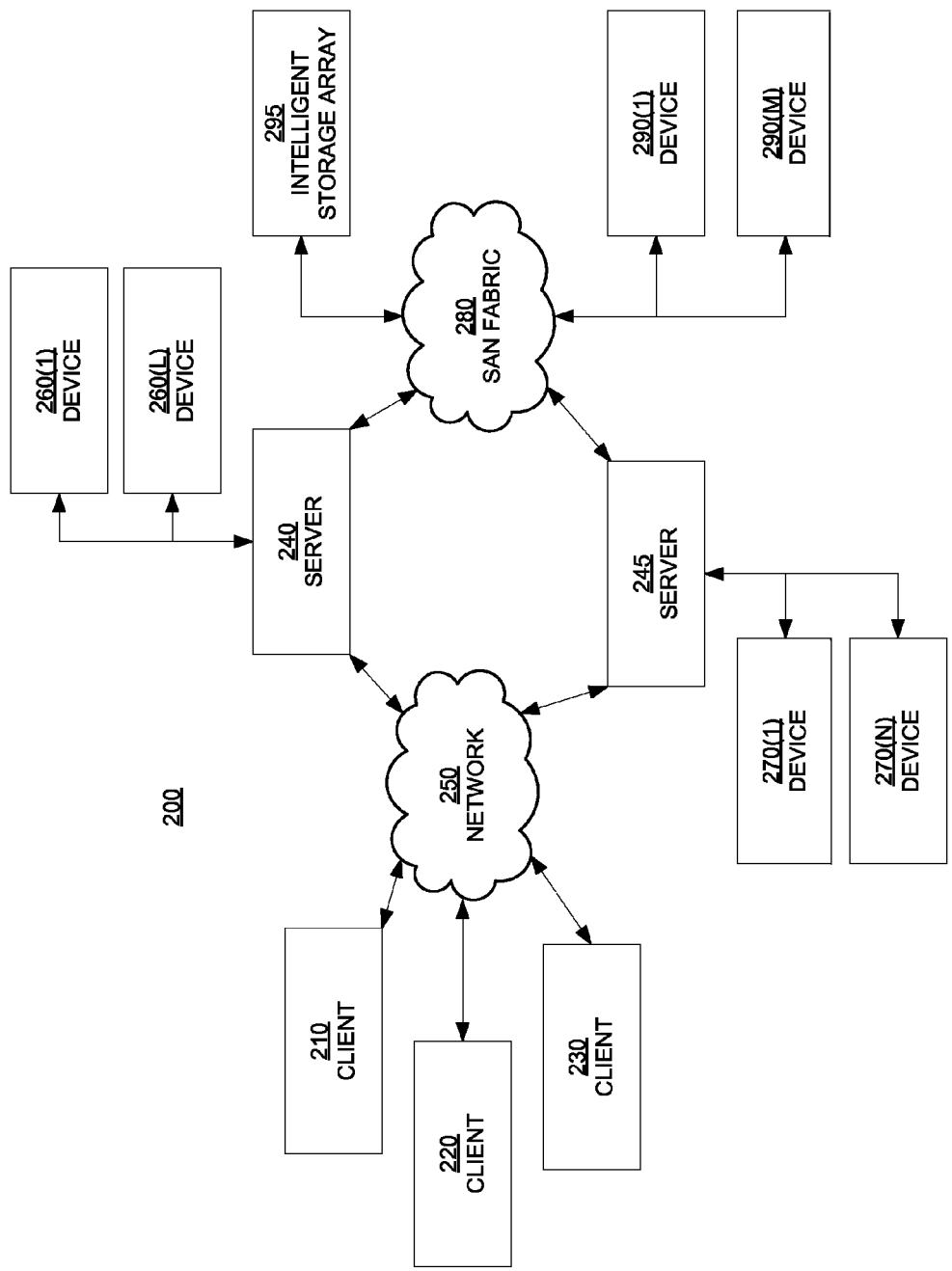
FIG. 2 is a block diagram of an example of a network architecture capable of implementing embodiments of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250.

Figure 3:
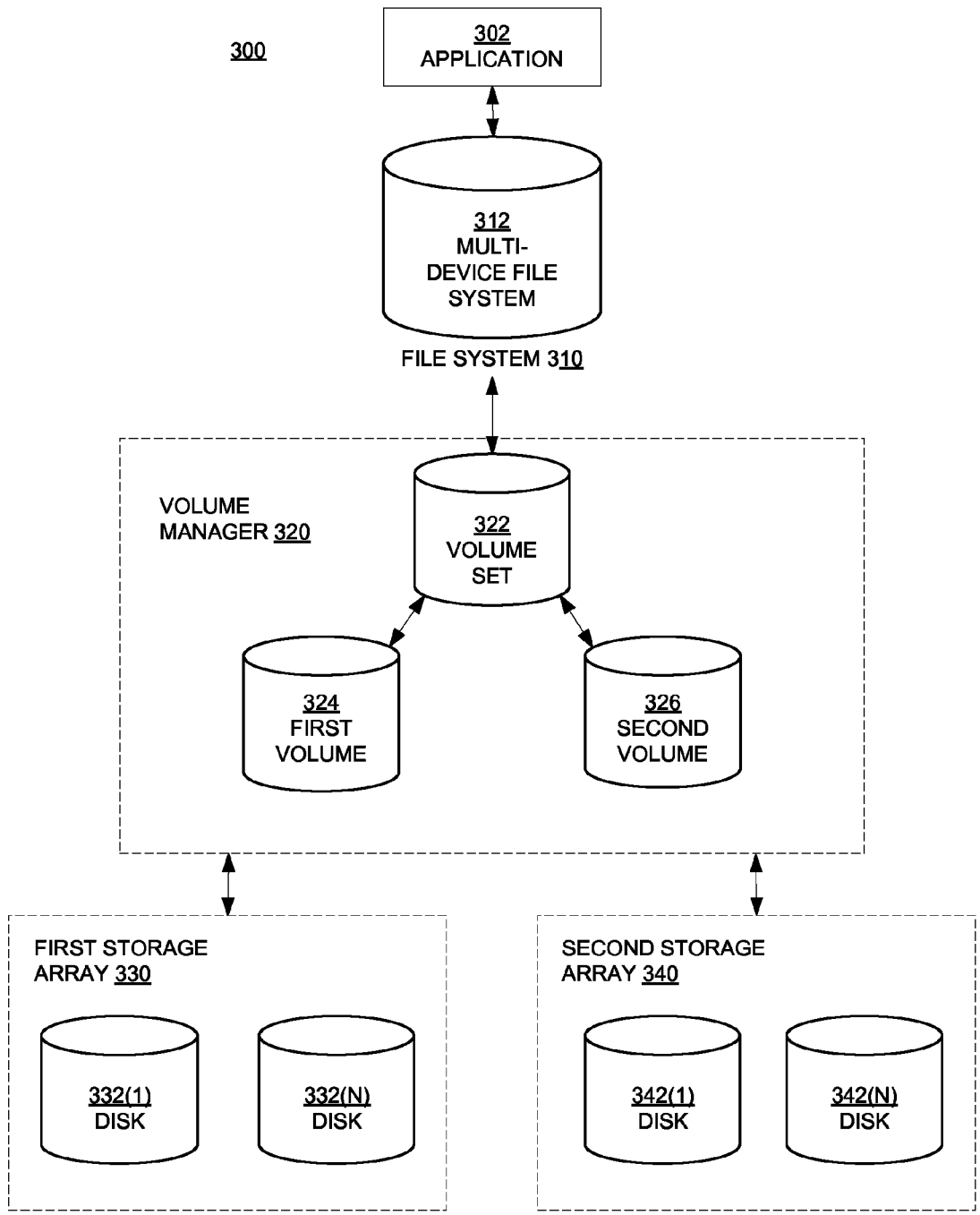
FIG. 3 is a block diagram of an example of a storage system capable of implementing embodiments of the present disclosure.

FIG. 3 is a block diagram of an example of a storage system 300 upon which embodiments of the present disclosure may be implemented. System 300 may include an application 302 in communication with a file system 310. File system 310 may include a multi-device file system 312 for multi-device storage. Multi-device storage generally refers to the use of different virtual or physical storage devices that provide differentiated storage for computing systems.

Storage system 300 can support multi-volume file systems through multi-device file system 312 and can provide automatic policy-based placement of portions (e.g., extents or blocks) of files within file system 310. A multi-volume file system may include file systems that occupy two or more virtual storage volumes. A multi-volume file system may present a single name space, making the existence of multiple volumes transparent to users and applications while maintaining awareness of each volume's identity, making it possible to control the locations at which portions of files are stored. In one embodiment, all files in multi-volume file system may be part of the same name space and are accessed and manipulated as though they occupy a single volume.

System 300 may also include a volume manager 320. Volume manager 320 may implement software-based virtualization for facilitating multi-device storage in the form of virtual volumes configured from multiple hardware devices. Volume manager 320 may include a volume set 322. As used herein, the phrase "volume set" generally refers to the volumes on which a file system is constructed. Volume set 322 may be divided into a first volume 324 and a second volume 326. For example, first volume 324 may include a first storage array 330 (e.g., disk 332(1) through disk 332(N)). Similarly, second volume 326 may include a second storage array 340 (e.g., disk 342(1) through disk 342 (N)).

Volume set 322 may be configured in a variety of manners. For example, first volume 324 and/or second volume 326 may be configured from enterprise disk array logical unit number units (LUNs), mid-range disk array LUNs, and/or disks connected directly to their host systems. First volume 324 and/or second volume 326 may also represent more complex configurations, such as mirrored volumes configured from RAID (Redundant Array of Independent Disks) LUNs presented by two disk arrays.

Figure 4:
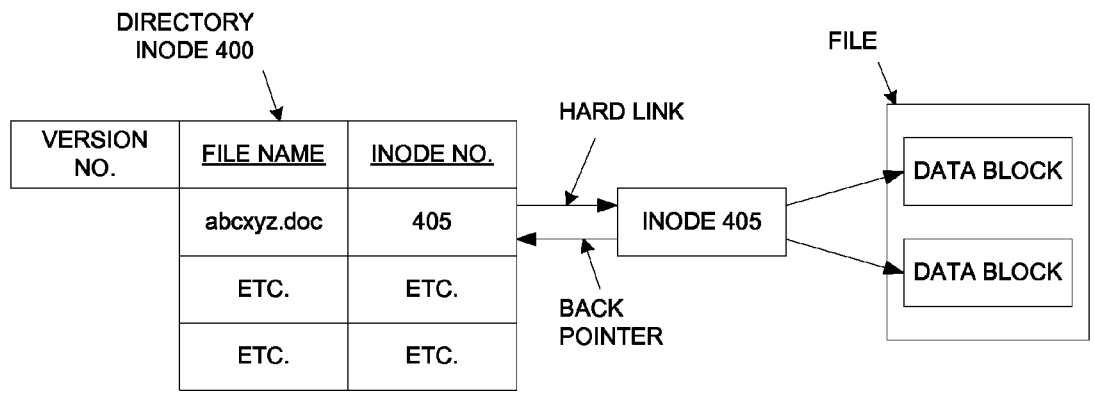
FIG. 4 is a block diagram illustrating a data structure (e.g., a database) according to an embodiment of the present disclosure.

FIG. 4 is a block diagram illustrating a data structure (e.g., a database) 400 according to an embodiment of the present disclosure. In the example of FIG. 4, data structure 400 represents a directory inode. The directory inode includes content such as file names and inode numbers that correspond to the file names—the directory inode maps file names to inode numbers.

In one embodiment, the directory inode includes, or is associated with, a version number. The version number changes if one or more of the entries in the directory inode changes, if an entry is added, or if an entry is deleted.

For each inode, a link count in the inode keeps track of how many directories point to (refer to) that inode—the link count counts the number of "hard links" to an inode. The link count can be used to indicate when an inode can be freed (deleted from the directory inode)—when a link count goes to zero, then no directories are pointing to that inode, allowing the disk space used by the inode and its associated disk blocks to be released.

An inode (e.g., inode 405) contains information about a file, except for the file name (which is in the directory inode). Information in an inode includes, but is not necessarily limited to, the type of file, permissions associated with the file, the link count, the file's size, information about when the inode or file was last accessed and modified and/or a version number for the inode, a back pointer to the directory inode, and address(es) that point to data block(s) that store the actual contents of the file (that is, the file data itself).

The following discussion is in the context of an "online full file system consistency check (FSCK)." As used herein, an online full FSCK, or simply FSCK, is a check of the file system integrity that can make changes to restore consistency while the file system is concurrently being accessed or modified by applications and/or processes.

Figure 5:
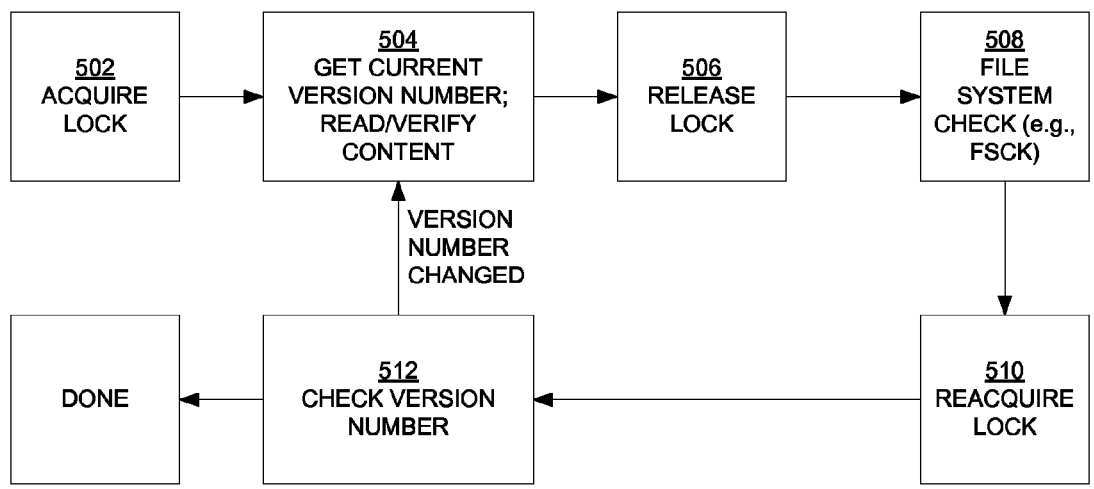
FIG. 5 illustrates a process for performing file system consistency checks according to an embodiment of the present disclosure.
Figure 6:
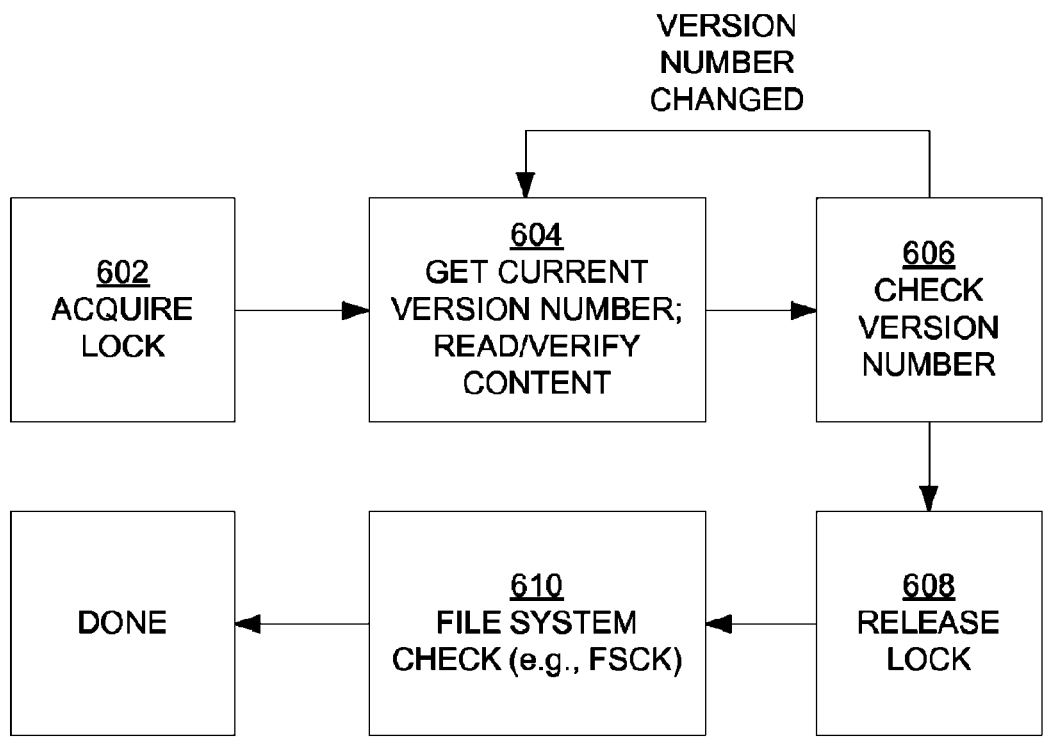
FIG. 6 illustrates a process for performing file system consistency checks according to another embodiment of the present disclosure.

The directory inode and the inodes themselves can be checked for inconsistencies using a checking and repair utility such as FSCK. FIGS. 5 and 6 illustrate processes for performing online full file system consistency checks according to embodiments of the present disclosure.

In block 502 of FIG. 5, in one embodiment, a lock on the directory inode is acquired. The lock may be a shared lock or an exclusive lock (a lock in shared mode or a lock in exclusive mode). However, generally speaking, the type of lock is less important than the role of that lock—a lock is placed on the directory inode to prevent updates to the data structure while it is being validated, as about to be described.

In block 504, with the lock in place, the version number associated with the directory inode is read and stored. Also, with the lock in place, the first part of the file system consistency check is performed. More specifically, with the lock in place, the contents of the directory inode are read and verified for correctness in block 504. For example, the file names can be checked to make sure that they are valid file names (e.g., they do not include invalid characters)—for ease of discussion, this step of the process may be referred to as a sanity check.

After the sanity check is completed, then the lock can be released (block 506). At this point, the inode numbers and file names have been read; therefore, enough information is known to identify and proceed with checking the inodes themselves. Importantly, the inodes can be checked in the background (offline) while the directory inode remains accessible and available. Furthermore, by completing the sanity check before the inodes are checked, invalid inodes can be eliminated from the remainder of the file system consistency check. In other words, only valid inodes are subsequently traversed and verified; computational resources are not wasted checking invalid inodes.

Next, in block 508, the remainder of the file system consistency check can be performed. More specifically, the (valid) inodes identified in the directory inode can be investigated to check on a number of things. For example, each inode can be checked to verify that it actually exists and that it is a file. The number of back pointers associated with each inode can be checked to make sure that it equals the number of hard links to that inode.

Other information associated with the inodes can be checked. For example, the size of the file associated with each inode can be checked to make sure it is within reasonable bounds. The number of free inodes can be determined. Other types of checks known in the art can be performed on the inodes.

Furthermore, if inconsistencies are detected, then the checking and repair utility (e.g., FSCK) can implement corrective actions. For example, if the stored link count and the actual link count do not match, then the stored link count can be updated with the actual link count. If an inode number in the directory inode points to an unallocated inode, then the entry in the directory can be removed. Other corrective actions known in the art can be performed depending on the type of inconsistency that is detected.

Once the inodes are checked, the lock on the directory inode can be reacquired in block 510, and the version number associated with the directory inode is again read in block 512. If the version number has changed, then the contents of the directory inode are again read and verified as described above (block 504 is repeated), the lock is released (block 506), and the remainder of the file system consistency check is again performed on the inodes (block 508).

In one embodiment, in block 504, the current version of the directory inode is compared to the previous (immediately preceding) version of the directory inode to identify changes between the two versions. In such an embodiment, the sanity check and/or the remainder of the file system consistency check (block 508) may be performed only on the inodes that have changed since the previous version.

It is possible that the directory inode may change constantly. To prevent a lack of progress and allow the process shown in FIG. 5 to proceed toward completion (in other words, to prevent the loop beginning and ending at block 504 from being repeated an inordinate number of times), a count can be maintained of the number of attempts made to verify the contents of the directory inode. If that count reaches or exceeds a threshold value, a lock can be acquired and held during the length of both the sanity check and the remainder of the FSCK. In other words, the lock can be acquired and held while both the directory inode and the inodes referenced by the directory inode are read and validated. By identifying changes in the directory inode from one version to the next and then only validating the changes in the manner described above, the length of time that the lock is in place can be shortened.

With reference now to FIG. 6, in one embodiment, a lock on the directory inode is acquired in block 602. With the lock in place, the version number associated with the directory inode is read and stored.

Also, with the lock in place, the contents of the directory inode are read and verified for correctness in block 604—that is, a sanity check as described above can be performed. After the sanity check is completed, and before the remainder of the file system consistency check is performed on the inodes themselves, and with the lock still in place, the version number of the directory inode is read (block 606) to see if the directory inode was changed while the sanity check was being performed. If the version number changed, the directory inode is again read and verified in block 604. Once a consistent version of the directory inode is obtained, then the lock can be released (block 608) and the remainder of the file system consistency check can be performed (block 610); that is, at that point, the inodes themselves can be verified as described above.

As presented above, the number of attempts to verify the contents of the directory inode can be limited to prevent the loop between blocks 604 and 606 from being repeated an inordinate number of times. Also, as presented above, changes in the directory inode from one version to the next can be identified, with only the changes then validated.

In general, according to the embodiments of FIGS. 5 and 6 described above, a "consistent" view of the directory inode is obtained. A consistent view means that the directory inode is consistent with the current version of file names and points to all of the inodes that it is supposed to—that is, the set of file names and inodes that exists at a point in time and is supposed to be included in the directory inode is indeed in the version of the directory inode that is read and verified. Once a consistent view of the directory inode is obtained, the inodes are checked while the file system, in particular the directory inode, remains accessible.

Figure 7:
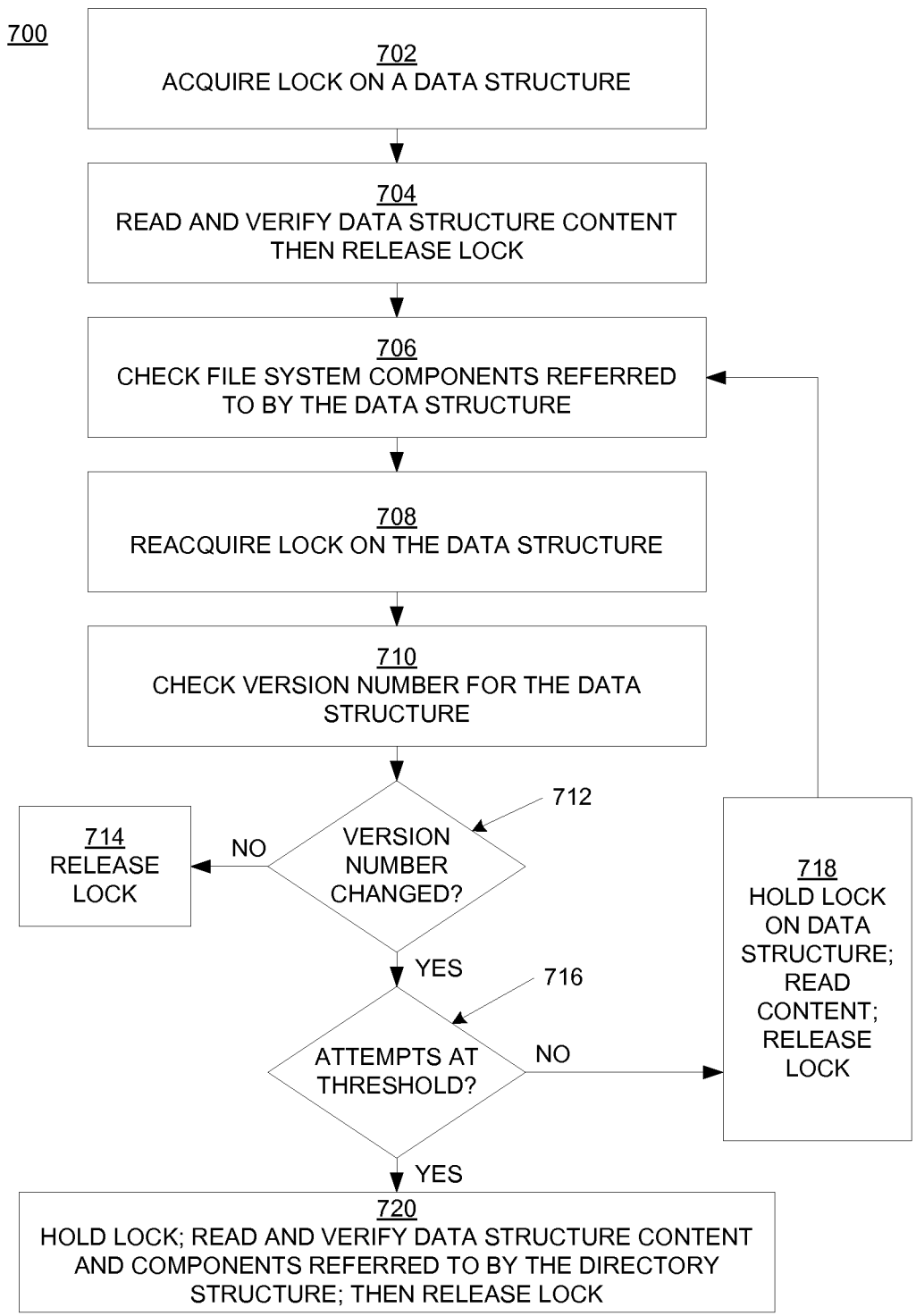
FIG. 7 is a flowchart of a computer-implemented process for performing online file system consistency checks according to an embodiment of the present disclosure.
Figure 8:
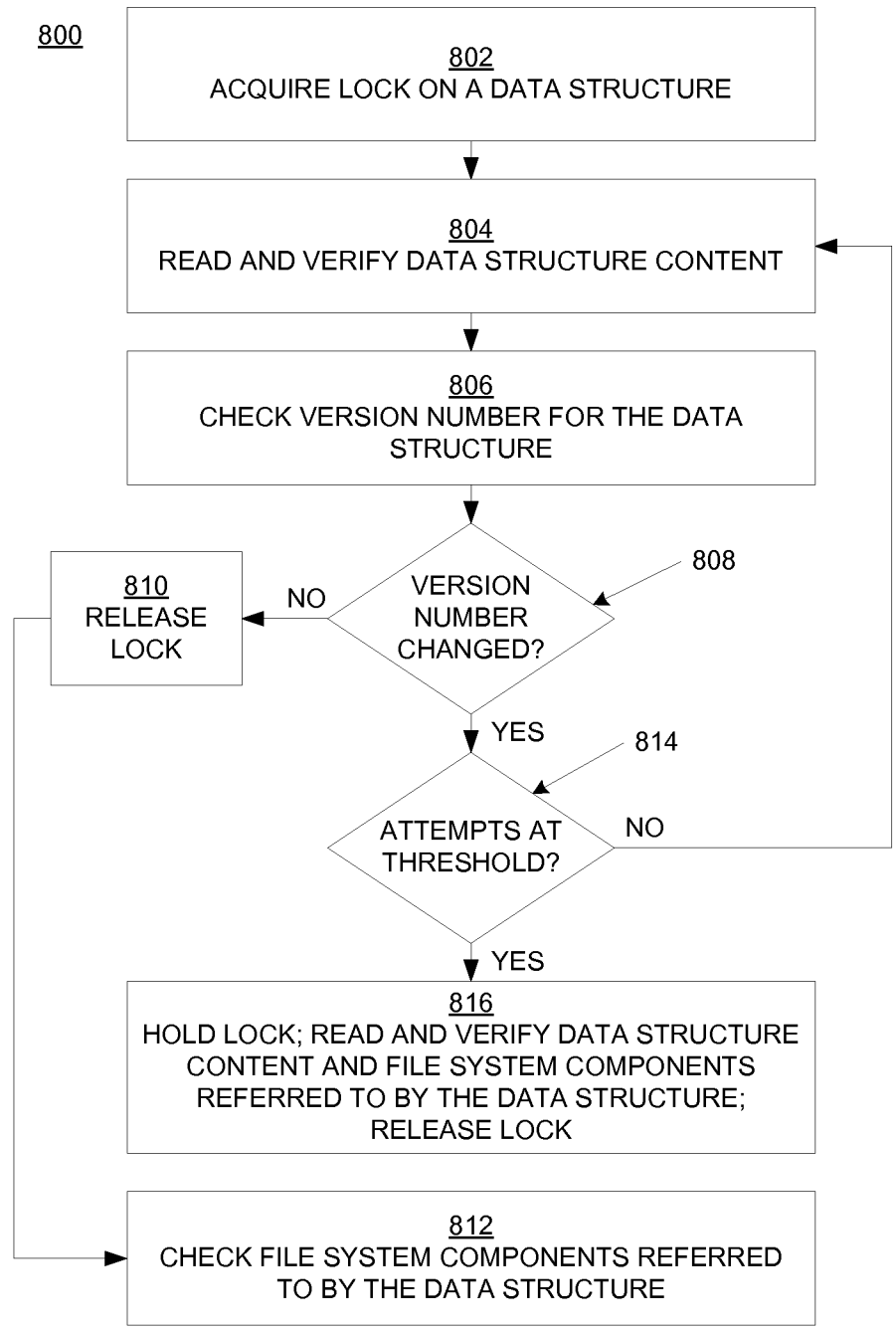
FIG. 8 is a flowchart of a computer-implemented process for performing online file system consistency checks according to another embodiment of the present disclosure.

FIGS. 7 and 8 are flowcharts 700 and 800, respectively, of a computer-implemented process for performing online file system consistency checks according to embodiments of the invention. Flowcharts 700 and 800 can be implemented as computer-executable instructions residing on some form of computer-readable storage medium (e.g., using computing system 110 of FIG. 1).

In block 702 of FIG. 7, a lock is acquired on a data structure a first time. In one embodiment, the data structure is a directory inode that includes file names and inode numbers.

In block 704, the content of the data structure is read and verified while the lock is held, and then the lock is released.

In block 706, after releasing the lock, a file system consistency check is performed on file system components referred to by the data structure. In one embodiment, the file system components include inodes.

In block 708, the lock is reacquired after the file system consistency check (block 706) is performed.

In block 710, a version number associated with the data structure is checked to see if the version number changed since the lock was acquired the first time.

In block 712, if the version number has not changed, then flowchart 700 proceeds to block 714 and the reacquired lock is released. If the version number has changed, then flowchart 700 continues to block 716.

In block 716, the number of attempts to verify the content is counted and compared to a threshold. If the number of attempts has not reached the threshold, then the flowchart proceeds to block 718; otherwise, the flowchart proceeds to block 720. In block 718, the lock on the data structure is held, the content of the data structure is again read and verified, and the lock is then released. In one embodiment, only content in the data structure that has changed is identified and read.

In block 720, if the number of attempts has reached the threshold, then in one embodiment the content in the data structure and the file system components pointed to by the data structure are verified while the lock is held. Once the content and the file system components are verified, then the lock can be released.

In block 802 of FIG. 8, a lock is acquired on a data structure. In one embodiment, the data structure is a directory inode that includes file names and inode numbers. In one embodiment, a version number is associated with the data structure.

In block 804, the contents of the data structure are read and verified while the lock is held.

In block 806, after the contents of the data structure are read and verified—essentially, after the data structure of FIG. 4, for example, is read from top to bottom—the version number associated with the data structure is checked to see if the version number changed during the period in which the operations of block 804 were being performed.

In block 808 of FIG. 8, if the version number did not change, then flowchart 800 proceeds to block 810 and the lock is released.

In block 812, after releasing the lock, the file system components referred to by the data structure are checked. In one embodiment, the file system components include inodes. In essence, the remainder of the file system consistency check is performed in a manner similar to that described above.

If the version number has changed, then flowchart 800 instead proceeds from block 808 to block 814. In block 814, the number of attempts to verify the content is counted and compared to a threshold. If the number of attempts has not reached the threshold, then the flowchart returns to block 804, where the content of the data structure is again read and verified with the lock in place. In one embodiment, only content in the data structure that has changed is identified and read.

If the number of attempts has reached the threshold, then in block 816, the lock is held while the content in the data structure and the file system components pointed to by the data structure are read and validated. The lock can then be released. Also, in one embodiment, the data structure is marked as having been checked. If an inode is subsequently added to the data structure, then that inode can be added to a working list of inodes to be checked at some later time.

The processes of FIGS. 7 and 8 can be useful for checking and validating directories using a reduced number of lock acquisitions. Those processes can also be used for searching directories such as those with tree-based structures—as the number of items in each node of a tree increases, reducing the number of lock acquisitions grows in importance.

Figure 9:
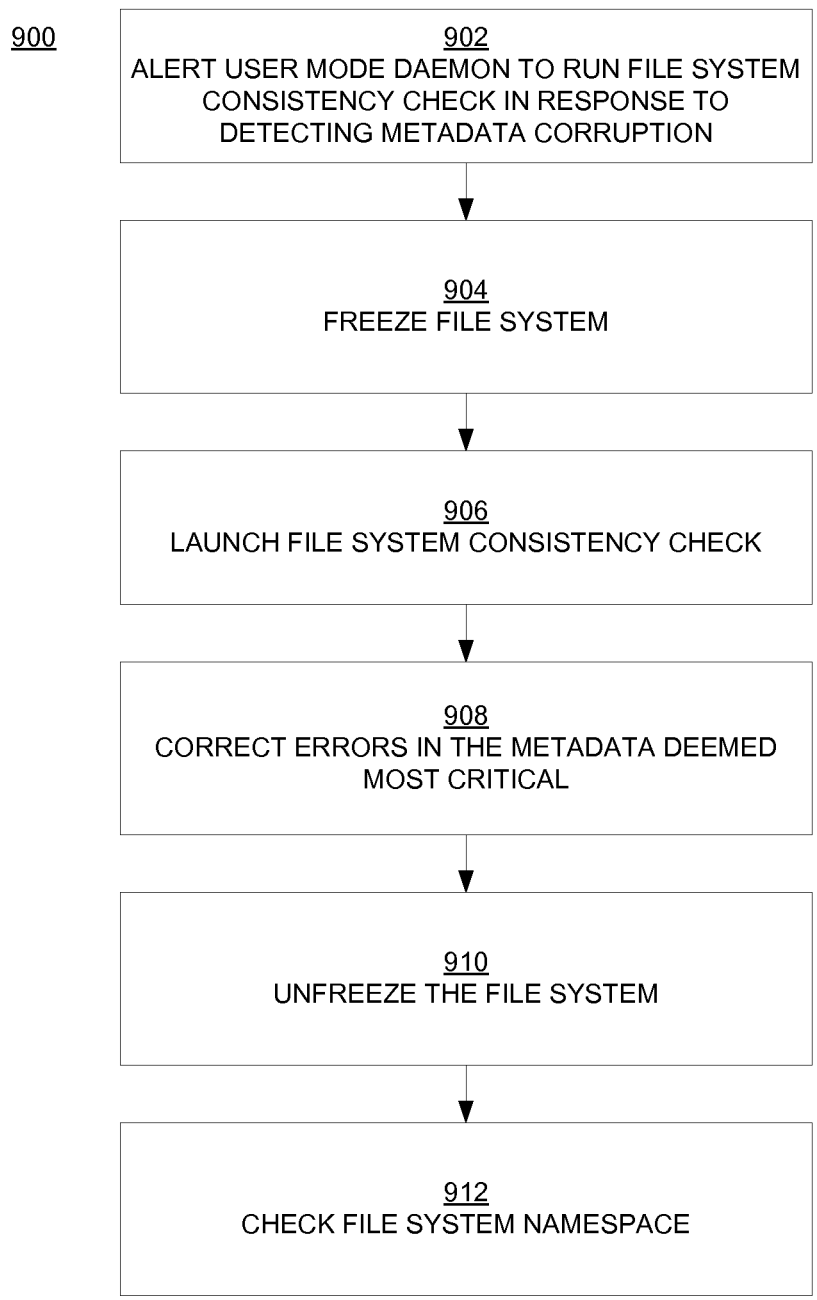
FIG. 9 is a flowchart of a computer-implemented process for performing online file system consistency checks according to another embodiment of the present disclosure.

FIG. 9 is a flowchart 900 of a computer-implemented process for performing online file system consistency checks according to an embodiment of the invention. Flowchart 900 can be implemented as computer-executable instructions residing on some form of computer-readable storage medium (e.g., using computing system 110 of FIG. 1).

In block 902, a user mode daemon is automatically alerted to run a file system consistency check (e.g., FSCK) in response to detecting corruption of the file system metadata.

In block 904, the file system is frozen. Client (user) requests to access files are blocked from entering the file system while the file system is frozen.

In block 906, the user mode daemon launches online FSCK to check the file system. This FSCK process will run with a new FSCK generation count.

In block 908, the online FSCK checks and corrects errors in the metadata that is deemed to be of importance, such as the super block, the structural inodes (inodes that contain information about the file system itself), and the inode of root directory of the file system. This phase of the check can take up to a few tens of seconds and is thus accomplished relatively quickly.

In block 910, the file system is unfrozen, which allows clients to access files and directories. The FSCK process proceeds to check the file system namespace at this stage, even as the users are accessing files.

In block 912, the online namespace check (block 910) entails traversing every inode accessible in the namespace, sanity checking the inode fields, and sanity checking the inode's block map or object map. Once the inode fields are checked and corrected for errors, the inode's parent directory (dotdot) field is updated to indicate connectivity to the parent directory in the current path from which the inode was accessed. Furthermore, every sane inode on disk in the namespace that is traversed by the FSCK process is marked with a FSCK generation count. In a later pass through the inode list, the FSCK process moves all inodes with an older generation count to a lost+found directory under the root directory.

"Insane" inodes—inodes with corruption that cannot be fixed—are marked as bad by the FSCK process and moved to a directory under the root directory of the file system. These inodes can be restored to a sane state by the system administrator using an existing copy on tape of the same file.

According to the embodiments of FIG. 9, by checking file system metadata for consistency using a background process and isolating/correcting errors in the background, a file server can provide continuous access to files for requests from client machines. During normal operation, if a file system detects inconsistency in its metadata, a file system consistency check (FSCK) is performed. By briefly freezing the file system (by blocking new client requests), the file system is able to validate and fix data structures for consistency. This prevents the metadata from further corruption by the clients. The user file metadata and namespace check are done in the background while continuously allowing access to files from clients (users).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions for causing a computer system to perform a method comprising an online full file system consistency check comprising:

acquiring a lock a first time on a data structure comprising content, said data structure stored in memory of said computer system;
checking said content while holding said lock, wherein said content comprises references to file system components and wherein said checking comprises identifying valid instances of said file system components and invalid instances of said file system components;
releasing said lock subsequent to said checking; and
after releasing said lock, accessing and checking only said valid instances of said file system components referred to by said data structure.

2. The computer-readable storage medium of claim 1 wherein said data structure comprises a directory inode, said content comprises file names and inode numbers, and said components comprise inodes.

3. The computer-readable storage medium of claim 1 wherein said method further comprises:
reacquiring said lock after said file system components are checked;
checking a version number associated with said data structure to determine if said version number changed since said lock was acquired said first time; and
if said version number changed, then verifying content in said data structure and releasing the reacquired lock.

4. The computer-readable storage medium of claim 3 wherein said method further comprises, if said version number changed, then identifying and verifying only content in said data structure that changed since said lock was acquired said first time.

5. The computer-readable storage medium of claim 1 wherein said method further comprises:
after said checking of said content and said file system components and before releasing said lock, checking a version number associated with said data structure to determine if said version number changed during said checking; and
if said version number changed, then again checking content in said data structure and valid instances of said file system components referred to by said data structure.

6. The computer-readable storage medium of claim 5 wherein said method further comprises, if said version number changed, then reading only content in said data structure that has changed.

7. The computer-readable storage medium of claim 1 wherein said method further comprises:
checking a version number associated with said data structure to determine if said version number has changed;
counting the number of attempts to check said content; and
if said number of attempts reaches a threshold, then acquiring another lock on said data structure and checking said content and valid instances of said file system components while holding said other lock.

8. A computer system comprising:
a processor; and
memory coupled to said processor and having stored therein instructions that, if executed by said computer system, cause said computer system to execute operations comprising:
obtaining a lock a first time on a data structure comprising content and having a version number associated therewith, wherein said content comprises references to file system components;
reading and verifying said content as part of an online full file system consistency check and then releasing said lock, wherein said verifying comprises identifying valid instances of said file system components and invalid instances of said file system components; and after releasing said lock, performing the remainder of said file system consistency check on only said valid instances of said file system components referred to by said data structure.

9. The computer system of claim 8 wherein said data structure comprises a directory inode, said content comprises file names and inode numbers, and said components comprise inodes.

10. The computer system of claim 8 wherein said operations further comprise:
reacquiring said lock;
checking said version number to determine if said version number changed since said lock was acquired said first time; and
if said version number changed, then verifying content in said data structure with the reacquired lock in place.

11. The computer system of claim 10 wherein said operations further comprise reacquiring said lock after it was released and before said version number is checked and then releasing the reacquired lock.

12. The computer system of claim 10 wherein, if said version number changed, then only content in said data structure that has changed since said lock was acquired is read.

13. The computer system of claim 8 wherein said operations further comprise:
checking a version number associated with said data structure to determine if said version number has changed;
counting the number of attempts to verify said content; and
if said number of attempts reaches a threshold, then acquiring another lock on said data structure and verifying said content and valid instances of said file system components while holding said other lock.

14. A computer-implemented method comprising:
protecting a directory with a lock a first time to obtain a consistent view of said directory;
checking content in said directory with said lock in place, wherein said content comprises inodes and wherein said checking comprises identifying valid instances of said inodes and invalid instances of said inodes;
releasing said lock such that said directory is accessible; and
with said directory accessible, checking only said valid instances of said inodes referred to by said directory concurrently with accesses to said directory.

15. The method of claim 14 wherein said process comprises an online full file system consistency check.

16. The method of claim 14 further comprising:
reacquiring said lock after it was released;
checking a version number associated with said directory to determine if said version number changed since said lock was acquired said first time; and
if said version number changed, then revalidating content in said directory; and
releasing the reacquired lock.

17. The method of claim 16 wherein said operation of reacquiring said lock is performed after said inodes are checked.

18. The method of claim 16 wherein, if said version number changed, then only content that has changed since said lock was acquired said first time is read.

19. The method of claim 14 further comprising:
after said checking of said content and before said checking of said valid instances of said inodes and with said lock in place, checking a version number associated with said data structure to see if said version number changed during said verifying; and
if said version number changed, then again validating content in said data structure.

20. The method of claim 19 further comprising, if said version number changed, then validating only content in said data structure that has changed.

* * * * *